Figures 1, 2:
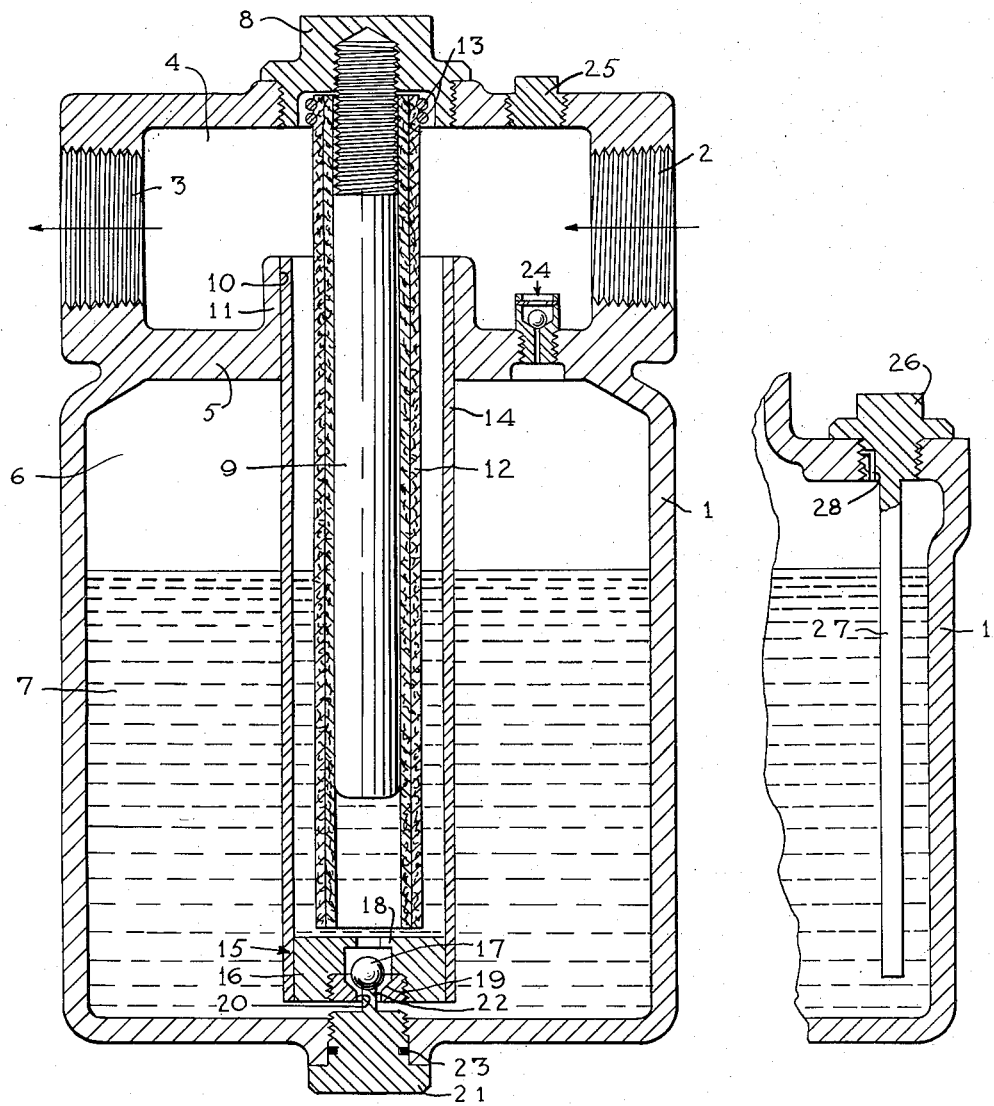

Aug. 18, 1959 R. B. MORRIS 2,899,977
ANTI-FREEZER FOR PIPE LINES
Filed Oct. 25, 1955

INVENTOR.
Robert B. Morris
BY
Adelbert A. Steinmiller
ATTORNEY

United States Patent Office 2,899,977
Patented Aug. 18, 1959

2,899,977

ANTI-FREEZER FOR PIPE LINES

Robert B. Morris, Chatham, N.J., assignor to Westinghouse Air Brake Company, Wilmerding, Pa., a corporation of Pennsylvania Application October 25, 1955, Serial No. 542,641

6 Claims. (Cl. 138—34)

This invention relates to anti-freezers for pipe lines through which fluid under pressure is transmitted and which may be subjected to sub-freezing temperatures when in use.

Conduits or pipes through which air or other pressurized fluid is transmitted, such as in railway train brake systems, for example, must be protected against freezing of any moisture condensation in the pipes to prevent obstruction of flow of the pressurized air or fluid in the system and, therefore, possible failure of brake operation. One way of preventing this dangerous condition is to interpose in the train air line a container of volatile anti-freeze liquid, such as alcohol, from which a wick extends into the pipe and path of the fluid stream as it flows, or is forced, through the pipe, to introduce the anti-freeze vapor therein to prevent freezing of any moisture in the pipes.

With many types of anti-freezers now in use, replenishing the supply of anti-freeze liquid presents a problem due to the existing fluid pressure in the pipes in which the anti-freezers are located. Hence, it is necessary to first isolate the anti-freezer and relieve the fluid pressure therein before refilling it with alcohol. This is usually done by closing a cock located in the conduit between the source of fluid pressure and the anti-freezer and then bleeding the conduit section in which the anti-freezer is located or by closing two cut-out cocks located in the pipe line on opposite sides respectively of the anti-freezer device.

Another method for isolating the anti-freezer, while refilling, is disclosed in a copending patent application of William C. Landis, Serial No. 495,920, filed March 22, 1955, now Patent No. 2,828,772, granted April 1, 1958 and assigned to the assignee of the present application. A cut-out cock forms a component part of the anti-freezer device, said cut-out cock serving, when in one position, to permit flow of fluid under pressure through the pipe and opening the alcohol chamber to the stream of flow, and, when in another position, to cut off the flow and isolate the alcohol chamber from fluid pressure in the pipe.

The first method above mentioned is objectionable in that it entails the added expense of one or more cut-out cocks and means for bleeding the pipe line as well as the inconvenience from a time-consuming viewpoint. The last-mentioned method eliminates the need for additional cut-out cocks and bleeding devices and simplifies the piping but the cut-out cock forming a part of the anti-freezer device adds to the cost thereof. In both cases, the flow of fluid under pressure through the pipe is necessarily cut off completely while refilling the anti-freezer. Thus, in the case of a railway air brake system, operation of the system is necessarily prevented.

Accordingly, the principal object of my invention is to provide an improved type of anti-freezer for pipe lines, characterized by simplified valve means for isolating the anti-freeze liquid storage chamber from the pressurized fluid in the pipe line while replenishing the supply of anti-freeze liquid in said chamber, but without stopping or restricitng the flow of fluid under pressure through the pipe in which the anti-freezer is installed.

Other objects and advantages will become evident from the following more detailed description of the invention when read in conjunction with the accompanying drawing, in which:

Fig. 1 is an elevational view, primarily in section, of an anti-freezer device embodying the invention, and Fig. 2 is a fragmental elevational view, partly in section, and partly in outline, of the anti-freezer device showing a filler plug arrangement.

*Description and operation*

The anti-freezer device embodying my invention comprises a casing 1 which is provided, at its upper portion as viewed in the drawing, with two axially aligned, screw-threaded pipe connections, or ports 2, 3, for installing said device in a fluid pressure conduit (not shown), one of said connections acting as an inlet, the other as an outlet, as indicated by the arrows, for a chamber 4 formed in said upper portion of the casing. The upper portion of the casing 1 is separated by a wall 5 from a lower portion of said casing in which is formed a chamber 6 wherein an anti-freeze liquid 7, such as alcohol, is contained.

The upper portion of the casing 1 is provided with an air-tight screw-threaded cap 8 from which a wick-supporting rod 9 is suspended by means of screw threads, said rod extending coaxially from said cap, through a bore 10 in a collar 11 formed on the wall 5, into chamber 6. A cylindrical wick 12, which is immersed in the alcohol 7 as more fully explained hereinafter, slidably fits on the rod 9 and extends from chamber 6 into the fluid or air stream passing through chamber 4 in the upper portion of casing 1, said wick abutting against the screw-cap 8 and being held in place as by friction rings 13 surrounding the upper end of the wick and rod.

A valve-carrying tubular member 14 secured to wall 5 as by having its upper end pressed into the bore 10 of the collar 11, extends into chamber 6 in surrounding relation to the wick 12 and rod 9, and terminates just short of the bottom of casing 1, as viewed in the drawing. The tubular member 14 carries at its lower extremity a check valve assemblage 15 comprising an annular mounting portion 16 pressed coaxially into the lower end of said tubular member and carrying a ball valve 17 which, though free to move inside said mounting portion, is prevented from escaping therefrom by a retaining shoulder 18 formed on the mounting portion. An annular valve seat 19, on which the ball valve 17 is adapted to seat, as will be more fully described hereinafter, is screwed into the mounting portion 16 and is provided with an opening 20 which permits communication therethrough between chamber 6 and chamber 4 by way of the tubular member 14 when the ball check 17 is unseated.

A screw plug 21 is provided in the bottom of casing 1, as viewed in the drawing, in axial alignment with the tubular member 14. The plug 21 has formed on its inner face an extension 22 of smaller diameter which extends through the opening 20 to engage the ball valve 17 and maintain it unseated when the plug 21 is screwed all the way into the casing 1 as shown in the drawing. The plug 21 may be screwed out of the casing 1 part way, without being withdrawn completely from the casing, to permit seating of the ball valve 17 on the seat 19. To insure against leakage past the plug 21, a sealing O-ring 23 is provided in an annular groove on the exterior of said plug.

Should a differential of pressure occur between the fluid pressures in chambers 4 and 6 as, for example, by a reduction of the pressure in chamber 4, a relief valve 24, shown as a simple ball-type check valve, is provided in the wall 5 between said chambers. A plug 25, which is removably secured in the casing 1 in axial alignment with the valve 24, may be removed to provide for installation or removal of the valve 24. The relief valve 24 unseats to effect equalization of pressures in chambers 6 and 4 by flow from chamber 6 to chamber 4. Reverse flow of fluid under pressure from chamber 4 to chamber 6 past valve 24 is prevented. If the relief valve 24 were not provided, equalization of pressures between chambers 4 and 6 could be effected only by way of the tubular member 14. This would be objectionable in that, upon a reduction of fluid pressure in chamber 4, relative to chamber 6, the alcohol 7 would be blown from chamber 6 into chamber 4, which would be an unnecessary waste of anti-freeze liquid.

An air-tight filler plug 26 (Fig. 2), by which access may be had to chamber 6 for replenishing the alcohol supply, is suitably and conveniently located in the casing 1. It should be understood that the filler plug 26 is not visible in the sectional view shown in Fig. 1. A graduated rod 27 is attached to the filler plug 26 and extends into chamber 6 for checking the alcohol level. The plug 26 has formed therein a slow pressure-release vent 28 opening to chamber 6 and closed to atmosphere when said plug is screwed all the way into the casing 1. When the plug 26 is partially screwed out of the casing 1, the vent 28 allows slow venting of fluid pressure in chamber 6 to atmosphere before the plug is removed entirely from the casing.

With the anti-freezer device installed in a fluid pressure conduit, the fluid under pressure flowing from inlet 2 to outlet 3, through chamber 4 over the wick 12, and traveling in the direction indicated in the drawing by the arrows, for example, will carry with it vaporized alcohol which will mix with moisture which may be present in the fluid under pressure to prevent freezing thereof should the temperature in said conduit reach the freezing or sub-freezing point of the moisture.

According to the invention, if it is desired to check the level of the alcohol 7 in chamber 6 or to replenish the supply thereof, it is simply necessary to loosen the plug 26 a slight amount until a "blowing" or "hissing" sound is heard. The "hissing" indicates that fluid pressure in chamber 6 is escaping by way of vent 28 in plug 26. While the "hissing" sound continues, the plug 21 should be screwed outwardly of the casing section 1 until said "hissing" ceases at plug 26. Cessation of the "hissing" will indicate that the ball valve 17 has seated on the seat 19 to cut off further fluid pressure from chamber 4 to chamber 6 by way of the opening 20. Fluid pressure in the tubular member 14 acting on the ball valve 17, while the plug 21 is in its outwardly screwed position, will keep said ball valve seated while the plug 26 is removed and the alcohol level is checked for possible replenishment of the supply.

It should be noted that while the refill plug 26 is removed from casing 1, the flow of fluid under pressure through chamber 4, and consequently through the conduit or pipe line, goes on uninterrupted, so that, where the anti-freezer is installed in the pipe lines of an air brake system, there is no interference with the operation of the brake system.

When the alcohol supply in chamber 6 has been checked and replenished, if required, the filler plug 26 is replaced, and the plug 21 is again screwed all the way into the casing 1 to restore communication between chamber 6 and chamber 4 by way of check valve 15 and tubular member 14.

From the above description of the invention it will be apparent that there is provided, for use with conduits by which fluid under pressure is transmitted, an anti-freezer device characterized by its simplicity of structure and operation and low cost of manufacture and maintenance, eliminating any necessity for closing remote cocks in the pressure lines, or even interrupting the operation of the brake system when checking or replenishing the supply of anti-freeze liquid.

Having now described the invention, what I claim as new and desire to secure by Letters Patent, is:

1. An anti-freezer device comprising a casing interposable in a fluid-pressure-transmitting conduit and having a first chamber through which fluid under pressure in the conduit flows and a second chamber for storing a volatile anti-freeze liquid, a wick disposed partly in said first chamber and partly in said second chamber for conducting the anti-freeze liquid from said second chamber to said first chamber for introducing it by vaporization into the fluid under pressure flowing in the conduit, and valve means by which, when in one position, said second chamber is in communication with said first chamber and operable to another position in which said communication is closed without interrupting the flow of fluid under pressure through said first chamber.

2. The combination defined in claim 1 further characterized by relief valve means interposed between said first chamber and said second chamber to effect equalization of fluid pressure in said second chamber with that in said first chamber whenever the pressure in said first chamber becomes lower than that in said second chamber.

3. An anti-freezer device for use in a conduit through which fluid under pressure is transmitted, comprising, in combination, a casing interposable in said conduit and having a first chamber through which said fluid under pressure flows and a second chamber for containing an anti-freeze liquid, means providing a communicating passageway between said chambers, a wick disposed in said passageway, partly in said first chamber and partly in said second chamber, for transmitting the anti-freeze liquid from said second chamber to said first chamber into the path of flow of the fluid under pressure, and valve means carried by said means and operable within said communicating passageway whereby said second chamber may be closed, at will, to said first chamber by way of said communicating passageway.

4. The combination defined in claim 3 further characterized by relief valve means interposed between said first chamber and said second chamber to effect equalization of fluid pressure in said second chamber with that in said first chamber whenever the pressure in said first chamber becomes lower than that in said second chamber.

5. An anti-freezer device for use in a conduit through which fluid under pressure is flowing, comprising, in combination, a first casing portion having oppositely arranged inlet and outlet connections for interposing said device in said conduit, said inlet and outlet connections opening to a first chamber in the casing through which fluid under pressure transmitted by said conduit may flow, a second casing portion provided with a second chamber separated from said first chamber by a separating wall connecting the two casing portions, said separating wall having formed therein a bore, a tubular member having one end fixedly disposed in said bore and extending into said second chamber with the other end terminating short of the casing wall of said second casing portion opposite the separating wall, said tubular member thereby providing means of communication between said first and second chambers, an air-tight cap removably secured in said first casing portion in the casing wall opposite said separating wall in axial alignment with said tubular member, wick means secured to said cap and extending therefrom through said first chamber in the path of flow of the fluid under pressure and into said tubular member coaxially relative thereto but terminating short of said other end, said wick means being effective to conduct anti-freeze liquid from said second chamber into the path of flow of fluid under pressure in said first chamber, a mounting member for a check valve device secured in said other end of said tubular member, a valve seat secured in said mounting member having an opening therein to provide for communication therethrough between said first chamber and said second chamber by way of said tubular member, a ball check-valve disposed in said mounting member normally in an unseated position relative to the valve seat, in which unseated position said communication is open, and operable to a seated position on said valve seat for closing said communication, an air-tight plug adapted to be screwed into the casing wall in said second casing portion opposite said separating wall in axial alignment with said tubular member and valve mounting member, said plug having formed thereon a projecting portion adapted to engage said ball check-valve for maintaining said valve in its unseated position when said plug is screwed all the way into the casing and for disengaging said valve and effecting operation thereof to its seated position when said plug is partly screwed out of said casing, and a relief valve device disposed in said separating wall operable to effect equalization of fluid pressure, other than by way of said communication through said tubular member, when the fluid pressure in said second chamber exceeds the fluid pressure in said first chamber.

6. An anti-freezer device comprising, in combination, a casing interposable in a conduit and through which fluid under pressure in the conduit may flow, said casing having therein a chamber for containing an anti-freeze liquid and normally subject to the pressure of fluid in the conduit, means by which said anti-freeze liquid is transmitted from said chamber into the path of flow of said fluid under pressure, a tubular member carried by said casing in surrounding relation to said means and providing a communication through which the fluid pressure in the conduit is exerted on the liquid in said chamber, check-valve means carried by said tubular member and comprising a valve member and a valve seat, and a screw-threaded plug screwed into a threaded bore formed in the casing, said plug being effective when screwed inwardly relative to the casing to one position to unseat said valve member from said valve seat to open said communication, and effective when screwed outwardly relative to the casing to a different position to cause said valve member to seat on said valve seat for closing said communication.

References Cited in the file of this patent

UNITED STATES PATENTS

| | | |
|---|---|---|
| 965,554 | Bayles | July 26, 1910 |
| 970,292 | Barbre | Sept. 13, 1910 |
| 1,220,336 | Hornsby | Mar. 27, 1917 |
| 1,336,984 | Wood | Apr. 13, 1920 |
| 1,418,942 | Link | June 6, 1922 |
| 1,778,138 | Wood | Oct. 14, 1930 |
| 2,236,525 | Davis | Apr. 1, 1941 |